(12) United States Patent
Moon et al.

(10) Patent No.: US 8,769,710 B2
(45) Date of Patent: Jul. 1, 2014

(54) ATOMIC FORCE MICROSCOPE SYSTEM USING SELECTIVE ACTIVE DAMPING

(71) Applicant: Agilent Technologies, Inc., Loveland, CO (US)

(72) Inventors: Christopher Ryan Moon, Cupertino, CA (US); Richard K. Workman, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/675,251

(22) Filed: Nov. 13, 2012

(65) Prior Publication Data

US 2014/0137300 A1 May 15, 2014

(51) Int. Cl.
| | |
|---|---|
| *G01Q 10/06* | (2010.01) |
| *G01Q 10/00* | (2010.01) |
| *G01Q 10/04* | (2010.01) |
| *G01Q 20/00* | (2010.01) |
| *G01Q 20/02* | (2010.01) |
| *G01Q 60/24* | (2010.01) |

(52) U.S. Cl.
CPC ............. *G01Q 10/065* (2013.01); *G01Q 10/00* (2013.01); *G01Q 10/04* (2013.01); *G01Q 10/045* (2013.01); *G01Q 20/00* (2013.01); *G01Q 20/02* (2013.01); *G01Q 60/24* (2013.01)
USPC ..................................... 850/4; 850/1; 850/33

(58) Field of Classification Search
CPC ... G01Q 10/065; G01Q 10/04; G01Q 10/045; G01Q 20/00; G01Q 20/02; G01Q 60/24
USPC ........... 850/1, 4, 8, 21, 33, 38, 52, 54; 73/105
See application file for complete search history.

(56) References Cited

U.S. PATENT DOCUMENTS

| | | | |
|---|---|---|---|
| 5,986,381 A | 11/1999 | Hoen et al. | |
| RE36,488 E * | 1/2000 | Elings et al. | 250/234 |
| 6,318,159 B1 * | 11/2001 | Chen et al. | 73/105 |
| 6,596,992 B2 * | 7/2003 | Ando et al. | 850/9 |
| 7,456,400 B2 * | 11/2008 | Shigeno et al. | 250/306 |
| 7,627,438 B1 * | 12/2009 | Salapaka et al. | 702/28 |
| 7,966,867 B2 * | 6/2011 | Watanabe et al. | 73/105 |
| 7,987,006 B2 | 7/2011 | Abramovitch et al. | |
| 8,291,510 B2 * | 10/2012 | Schroeder et al. | 850/4 |
| 8,302,456 B2 * | 11/2012 | Proksch | 73/1.89 |
| 2006/0191329 A1 * | 8/2006 | Adderton et al. | 73/105 |
| 2007/0214864 A1 * | 9/2007 | Proksch | 73/1.79 |

(Continued)

FOREIGN PATENT DOCUMENTS

WO   WO2012115653   8/2012

OTHER PUBLICATIONS

Sulchek, et al. "Characterization and optimization of scan speed for tapping-mode atomic force microscopy", Review of Scientific Instruments, vol. 73, No. 8, Aug. 2002.

*Primary Examiner* — Michael Logie

(57) ABSTRACT

An atomic force microscope (AFM) system comprises a cantilever arm attached to a probe tip. The system controls a height of the cantilever arm to press the probe tip against a sample and then separate the probe tip from the sample, to detect a disturbance of the cantilever arm after the separation of the probe tip from the surface, and to engage active damping of the cantilever arm to suppress the disturbance.

15 Claims, 10 Drawing Sheets

(56) References Cited

U.S. PATENT DOCUMENTS

| | | | |
|---|---|---|---|
| 2010/0269232 A1* | 10/2010 | Workman | 850/33 |
| 2012/0304343 A1* | 11/2012 | Moon | 850/33 |
| 2013/0025791 A1* | 1/2013 | Marte et al. | 156/378 |
| 2013/0061356 A1* | 3/2013 | Proksch | 850/18 |
| 2013/0110262 A1* | 5/2013 | Abramovitch et al. | 700/42 |

* cited by examiner

ATOMIC FORCE MICROSCOPE SYSTEM USING SELECTIVE ACTIVE DAMPING

BACKGROUND

An atomic force microscope (AFM) is a measurement instrument that can be used to map-out various attributes of a small (e.g., nanoscopic) sample, such as its surface topography or material properties. For example, an AFM can be used to capture a nanoscale image of an integrated circuit or to measure nanoscale stiffness variations of a blended polymer surface.

A typical AFM comprises a mechanical probe tip connected to a cantilever arm. The cantilever arm is controlled by one or more actuators to raise and lower the probe tip with respect to the sample and/or to vibrate the cantilever arm with a desired pattern. During typical operation, the probe tip is moved across a sample surface, and mechanical interactions between the probe tip and the sample produce deflection of the cantilever arm. This deflection is then detected and used to quantify one or more attributes of interest. For instance, the deflection can be transformed into a quantitative measurement of some physical attribute of the sample through the use of one or more nanomechanical models.

One way for an AFM to measure the material properties of a sample is through the use of force-height curves. A force-height curve is a measurement that indicates the magnitude of force between the probe tip and the sample as a function of some height measurement, such as the height of the actuator. For instance, a force-height curve may be generated for a single location of a sample by detecting cantilever deflection while lowering the actuator until the probe tip touches down at that location, continuing to lower the actuator so that the probe tip presses against the sample with increasing force, and then raising the actuator until the probe loses contact with the sample. To map-out the material properties of a sample, this process may be repeated multiple times for each of multiple locations of the sample.

As the probe tip presses against the sample, the cantilever may deflect (e.g., bend) according to the stiffness or other material properties of the sample. For instance, where the sample is relatively soft, the cantilever may bend by a relatively small amount, and where the sample is relatively stiff, the cantilever may bend by a relatively large amount. The cantilever deflection during this part of the measurement can be used to determine the sample stiffness or some other material property at that location.

Subsequently, when the actuator is raised and the probe tip loses contact with the sample, the cantilever arm may begin to vibrate, or ring, due to an adhesive force between the probe tip and the sample. For instance, the sample may have a certain amount of stickiness or water tension that may adhere to the probe tip, so in order to lift the probe tip from the sample, the cantilever arm must build up enough energy to overcome the stickiness or water tension. Once enough energy is built up, the probe tip will "snap-off" the sample and vibrate back and forth until the vibration decays through a natural damping process. This damping process may last a relatively long time when the cantilever arm is operating in air because air has a relatively low damping coefficient.

For most applications, the vibration or ringing of the cantilever arm is not considered to provide useful information. For example, the ringing tends to obscure any measurable probe tip-sample interactions, so it is generally not useful for determining material properties of the sample. Nevertheless, the vibration cannot simply be ignored because it can potentially damage the sample. Accordingly, it is usually necessary to wait for the vibration to decay before performing a next force-height measurement.

Unfortunately, this waiting process can significantly slow the process of mapping-out material properties using force-height curves. Accordingly, there is a general need for techniques to address the vibrations or ringing in order to improve the speed of generating force-height curves.

SUMMARY

In a representative embodiment, a method is provided for operating an AFM system comprising a cantilever arm attached to a probe tip. The method comprises controlling a height of the cantilever arm to press the probe tip against a sample and then separate the probe tip from the sample, detecting a disturbance of the cantilever arm after the separation of the probe tip from the surface, and engaging active damping of the cantilever arm to suppress the disturbance. The method may further comprise detecting suppression of the disturbance, and disengaging the active damping upon detecting the suppression.

In another representative embodiment, another method is provided for operating an AFM system comprising a cantilever arm and a probe tip connected to the cantilever arm. The method comprises performing a plurality of force-height measurements to detect a force between the probe tip and a sample as a function of a height of the cantilever arm, and between successive force-height measurements, enabling active damping of the cantilever arm to suppress a disturbance produced upon separation of the probe tip from the surface and then disabling the active damping upon suppression of the disturbance.

In another representative embodiment, an AFM system comprises a cantilever arm, a probe tip attached to the cantilever arm, and a controller configured to control a height of the cantilever arm to press the probe tip against a sample and then separate the probe tip from the sample, to detect a disturbance of the cantilever arm after the separation of the probe tip from the surface, and to engage active damping of the cantilever arm to suppress the disturbance. The controller may be further configured to detect suppression of the disturbance and to disengage the active damping upon detecting the suppression.

BRIEF DESCRIPTION OF THE DRAWINGS

The described embodiments are best understood from the following detailed description when read with the accompanying drawing figures. Wherever applicable and practical, like reference numerals refer to like elements.

DESCRIPTION OF EMBODIMENTS

Figure 1A:
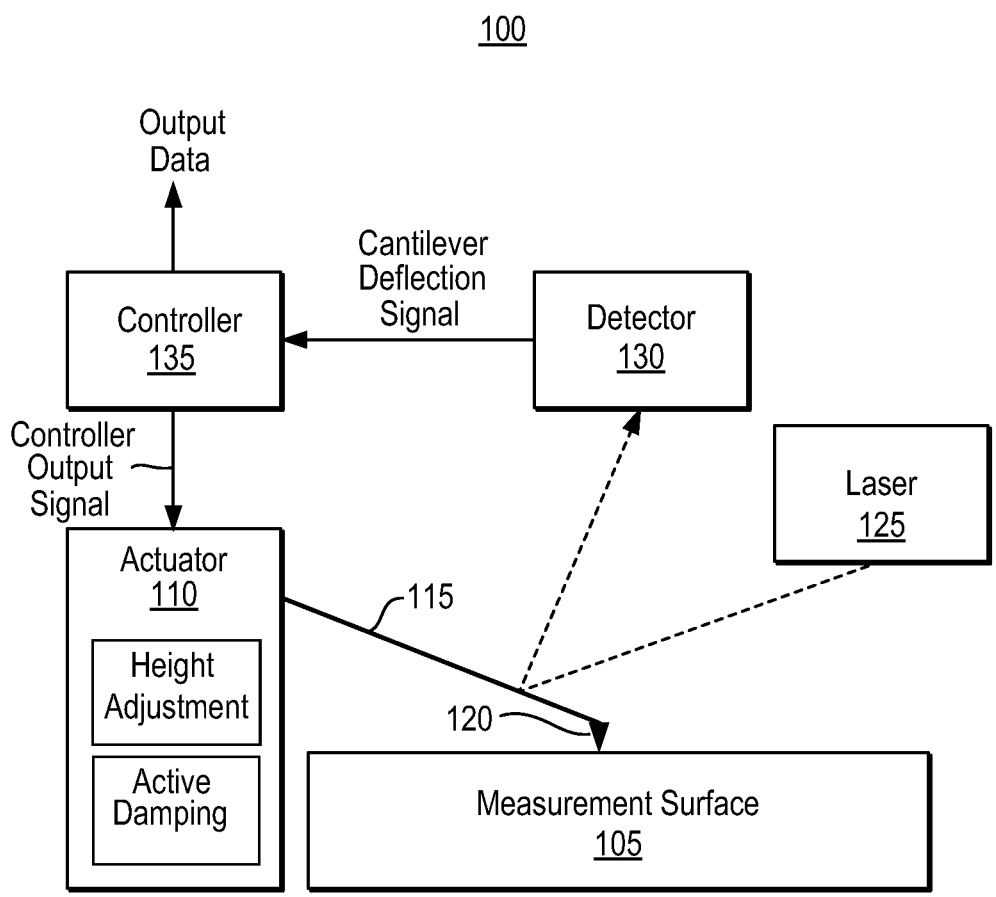
FIGS. 1A-1D are block diagrams of an AFM system according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices.

The described embodiments relate generally to AFM systems configured to perform force-height measurements. In certain embodiments, an AFM system uses active damping on a selective basis during these measurements to reduce or eliminate disturbances that may arise in the system's cantilever arm when its probe tip snaps off the surface of a sample being measured. For convenience, this description may refer to these disturbances as vibrations or ringing, although the described embodiments are not limited to the described types of disturbances.

The active damping may be enabled, for instance, upon detection of some event indicative of ringing, such as a swing in a cantilever deflection signal from a negative value to a positive value, a large derivative of the cantilever deflection signal, or a large amount of energy at a particular frequency in the cantilever deflection signal. The active damping may then be disabled, for instance, upon detection of another even indicative of sufficient damping of the ringing. Alternatively, the active damping may be enabled or disabled according to a predetermined timing scheme or timer. For instance, it may be enabled on a periodic basis according to an expected duration of the ringing.

The active damping is typically designed to reduce vibrations at certain dominant frequencies, such as higher-order eigenmodes of the cantilever arm. These frequencies can be determined, for instance, by measuring the frequency response of the AFM system in a calibration procedure, and they can be damped by applying an appropriate counteracting force to the cantilever arm.

In certain embodiments, the active damping is implemented with components that are ordinarily used to generate alternating current (AC) mode vibrations. For example, some AFM systems include an actuator that is designed to move the cantilever arm up and down periodically, or oscillate, in AC mode. However, during other modes of operation, this actuator may remain idle. Accordingly, when performing active damping while generating force-height curves, this actuator may provide the counteracting force to damp vibrations of the cantilever arm.

The reduction or elimination of disturbances through selective active damping can allow significant improvements in the speed of force-height measurements. For example, some experiments have shown a 5× improvement in the speed of force-height measurements when using the selective active damping. In addition, the reduction of disturbances can also prevent the sample from being damaged by the probe tip and can make it easier to identify electronic drift in a cantilever deflection signal.

Figure 1B:
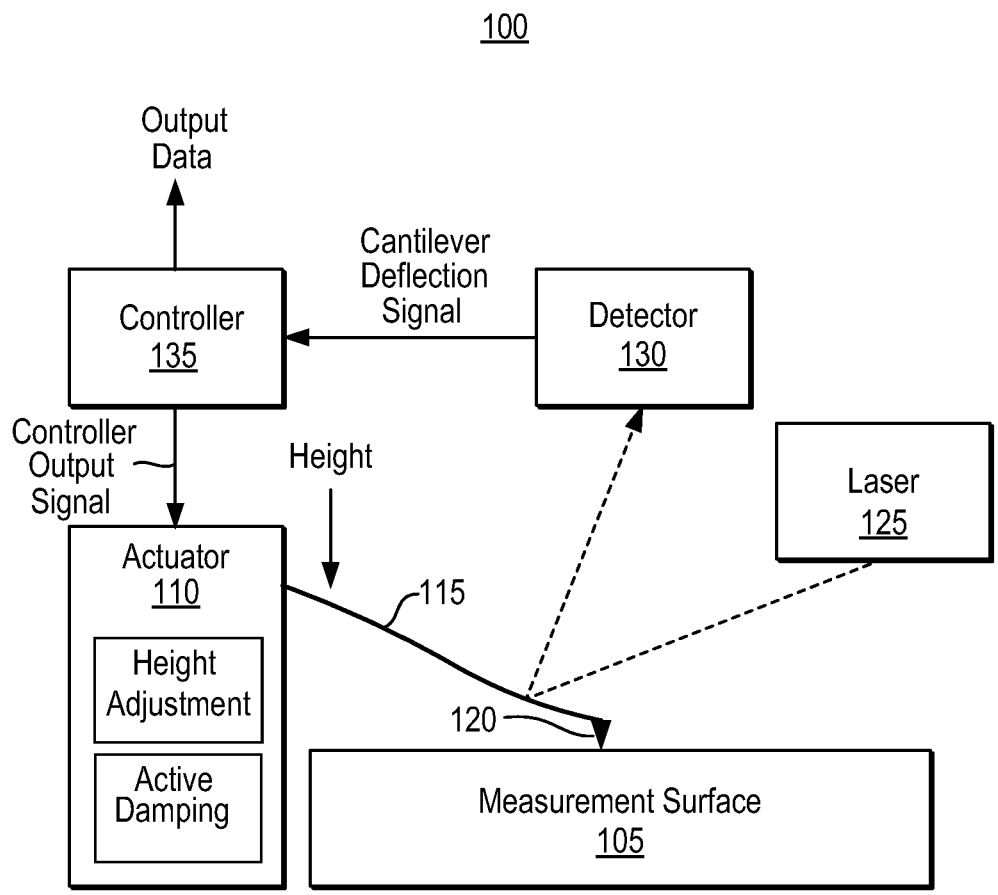
Figure 1C:
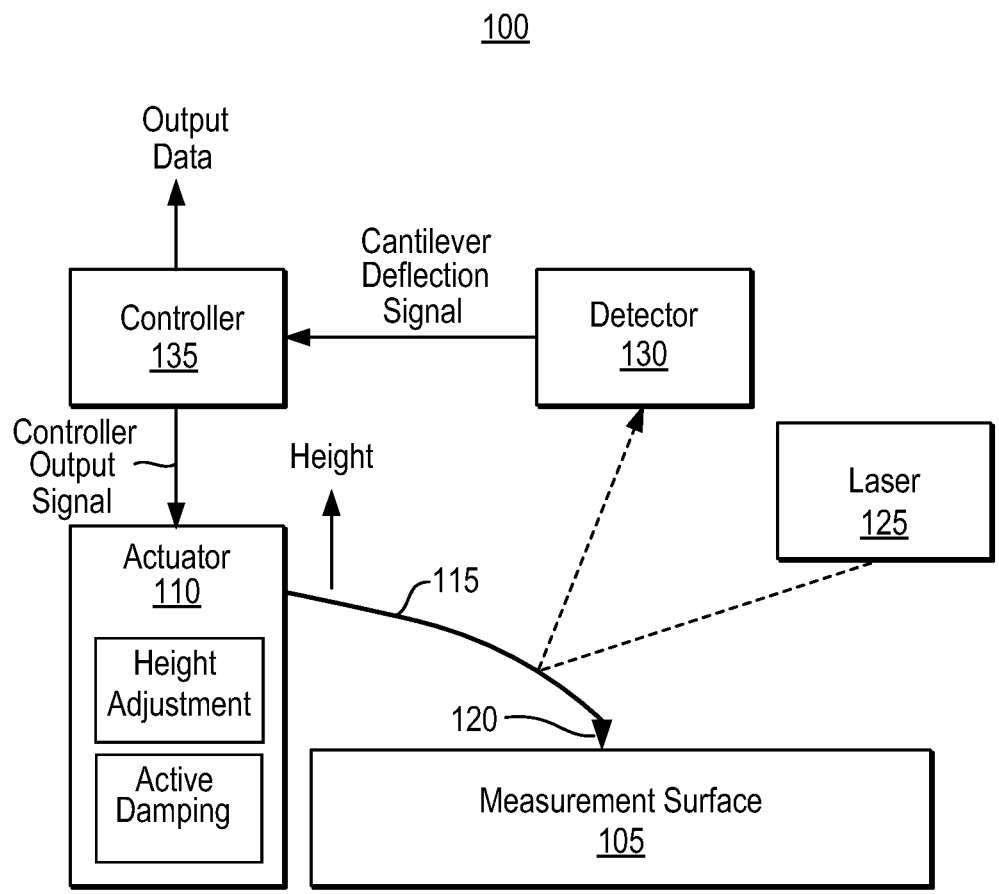
Figure 1D:
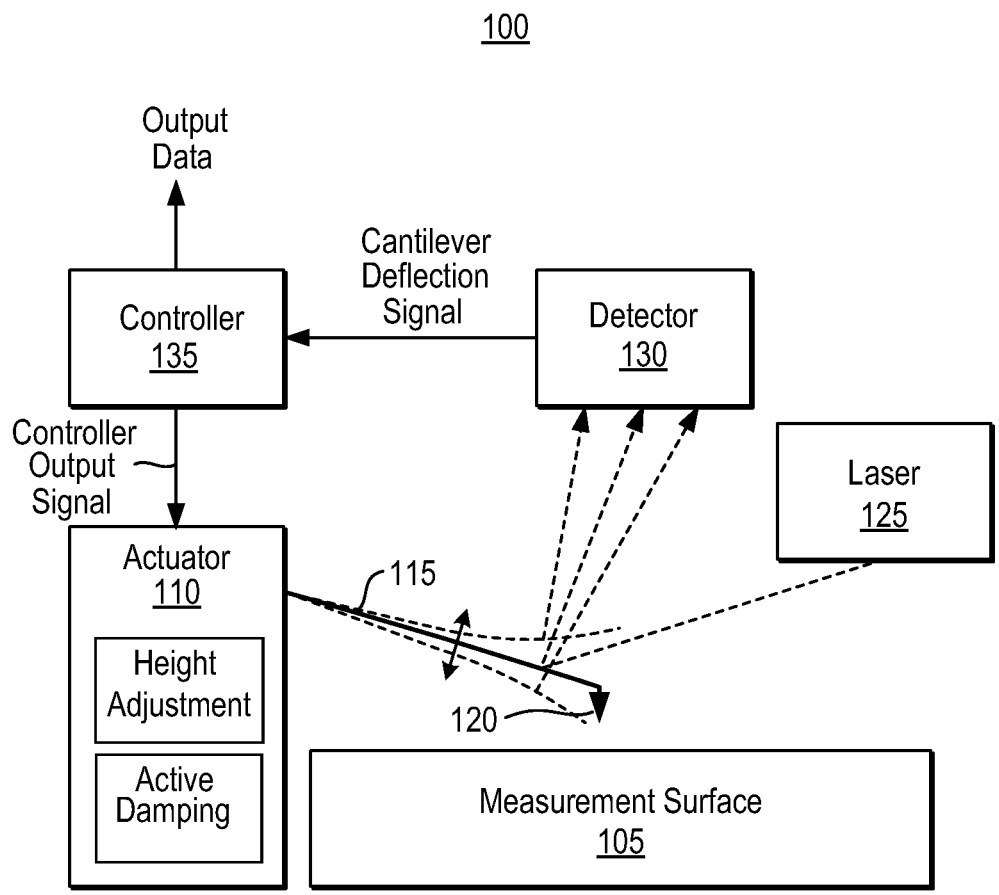

FIGS. 1A-1D are block diagrams of an AFM system 100 according to a representative embodiment. These figures show AFM system 100 at different stages of a force-height measurement. In particular, FIG. 1A shows AFM system 100 when its probe tip first contacts a measurement surface of a sample, FIG. 1B shows AFM system 100 when its probe tip is pressed down against the measurement surface, FIG. 1C shows AFM system 100 as its probe tip is being pulled away from the measurement surface, and FIG. 1D shows AFM system 100 immediately after the probe tip has snapped off the measurement surface.

Referring to FIGS. 1A-1D, AFM system 100 comprises an actuator 110, a laser 125, a detector 130, and a controller 135. Actuator 110 is connected to a cantilever arm 115 having a probe tip 120. The force-height measurement is performed by lowering probe tip 120 onto a measurement surface 105 as shown in FIG. 1A, pressing probe tip 120 down against the surface as shown in FIG. 1B, and then pulling probe tip 120 away from the surface as shown in FIG. 1C until it snaps off of the surface as shown in FIG. 1D. Each cycle of lowering, pressing, and raising probe tip 120 produces a force-height curve, as will be described in further detail below. Moreover, the process of lowering, pressing, and raising can be repeated multiple times at each of several locations on measurement surface 105 to generate multiple force-height curves that can be converted into a map of material properties of measurement surface 105.

Actuator 110 comprises a height adjustment component used to control the height of a proximal end of cantilever arm 115, and it further comprises an active damping component used to counteract ringing of cantilever arm 115. As illustrated by a downward arrow in FIG. 1B, the height adjustment component moves the proximal end of cantilever arm 115 downward toward measurement surface 105. This produces bending in the cantilever arm proportional to the surface's stiffness. Thereafter, as illustrated by an upward arrow in FIG. 1C, the height adjustment component moves the proximal end of cantilever arm 115 upward from measurement surface 105. This produces bending in an opposite direction, which is proportional to an adhesive force between probe tip 120 and the measurement surface. Then, as illustrated by a double headed arrow in FIG. 1D, after cantilever arm 115 loses contact with measurement surface, it vibrates back and forth due to a recoil effect produced by the adhesive force. The active damping component operates to counteract this vibration so that it decays more quickly than it would in the absence of active damping.

The height adjustment component and active damping component are typically implemented by two different piezoelectric actuators. Examples of such actuators are disclosed in commonly owned U.S. Pat. No. 8,291,510, entitled "Tandem Piezoelectric Actuator and Single Drive Circuit for Atomic Force Microscopy," to D. Schroeder, et al., dated Oct. 16, 2012, the subject matter of which is hereby incorporated by reference. Alternatively, these components can be implemented by electrostatic "nanostepper" actuators, for example, as described in commonly owned U.S. Pat. No. 5,986,381 to S. Hoen et al., dated Nov. 16, 1999, entitled "Electrostatic Actuator with Spatially Alternating Voltage Patterns," the disclosure of which is hereby incorporated by reference. Additionally, the active damping component can be implemented by the same piezoelectric actuator used to create periodic movement of the cantilever arm in AC mode operation.

Laser 125 (or another suitable light source) is disposed above measurement surface 105. It directs light that is reflected at cantilever arm 115 and is incident on detector 130. Detector 130 generates a deflection signal determined by an angle at which light is reflected off of cantilever arm 115, and it transfers the deflection signal to an analog-to-digital converter (ADC). The ADC digitizes the deflection signal to produce a cantilever deflection signal, which is transmitted to controller 135. As illustrated by dotted lines in FIGS. 1A-1C, the angle at which the light is reflected at cantilever arm 115 changes according to the bending and/or vibration of cantilever arm 115.

Controller 135 receives the cantilever deflection signal and produces output data based on this signal. In addition, controller 135 transmits a controller output signal to actuator 110. The controller output signal may control, for instance, the lowering and raising of cantilever arm 115, the enabling and disabling of active damping, and the active damping deflections produced by the active damping component. In some embodiments, for instance, controller 135 enables active damping as a consequence of detecting ringing in cantilever arm 115 based on analysis of the cantilever deflection signal.

Although FIGS. 1A-1C show only one controller output signal, AFM system 100 may use two controller output signals to separately control the height adjustment component and the active damping component. Nevertheless, for simplicity, the following description will assume that a single controller output signal is used to control both components.

Controller 135 can be implemented in whole or in part by a processing device, such as a processor or central processing unit (CPU), application specific integrated circuits (ASICs), field-programmable gate arrays (FPGAs), or combinations thereof, using software, firmware, hard-wired logic circuits, or combinations thereof. Details of certain aspects of the functions of controller 135 are provided below in connection with the representative embodiments. In some embodiments, controller 135 is implemented on a real-time operating system (OS) used in AFM system 100 or as a standalone device.

When using a processor or CPU, a memory (not shown) is included for storing executable software/firmware and/or executable code that controls the signal from controller 135 to actuator 110. The memory may be any number, type and combination of nonvolatile read only memory (ROM) and volatile random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

In one example, controller 135 comprises an FPGA onto which hardware description language (such as Verilog or VHDL) code has been compiled and uploaded. The deflection signal from detector 130 is digitized by the ADC. Based on the deflection signal, the FPGA creates the controller output signal that emerges from the DAC, is amplified, and then provided to actuator 110. Controller 135 may include, for instance, a proportional-integral-differential (PID) filter block and a series of digital biquadratic filters, for example. The PID filter block and the digital biquadratic filters of controller 135 have coefficients useful in establishing filter characteristics. The coefficients can be dynamically reconfigured to change the filter characteristics, such as by a remote computer (e.g. a computer hosting a graphical user interface for AFM system 100 and communicating via a communication protocol, such as Ethernet). Alternatively, controller 135 can be tuned to automatically to compensate for various system dynamics, as described in commonly owned U.S. Pat. No. 7,987,006 by D. Abramovitch et. al., which is hereby incorporated by reference.

The frequency response of controller 135 is a function of the filter coefficients, and methods for calculating theoretical frequency responses for digital filters are well-known. Illustratively, the frequency response of controller 135 can be calculated using known programming software (e.g., Matlab). For example, a notch filter for use in mitigating resonant vibrations of cantilever arm 115, such as those illustrated in FIG. 1D, can be specified by a center frequency, a depth, and a width (quality (Q) or damping factor). An example of such a notch filter is described in commonly owned International Application PCT/US11/26191 to C. Moon, which is hereby incorporated by reference. The frequencies to be notched out may include, for instance, eigenmodes of cantilever arm 115, and these frequencies can be determined through a calibration operation.

Figure 2:
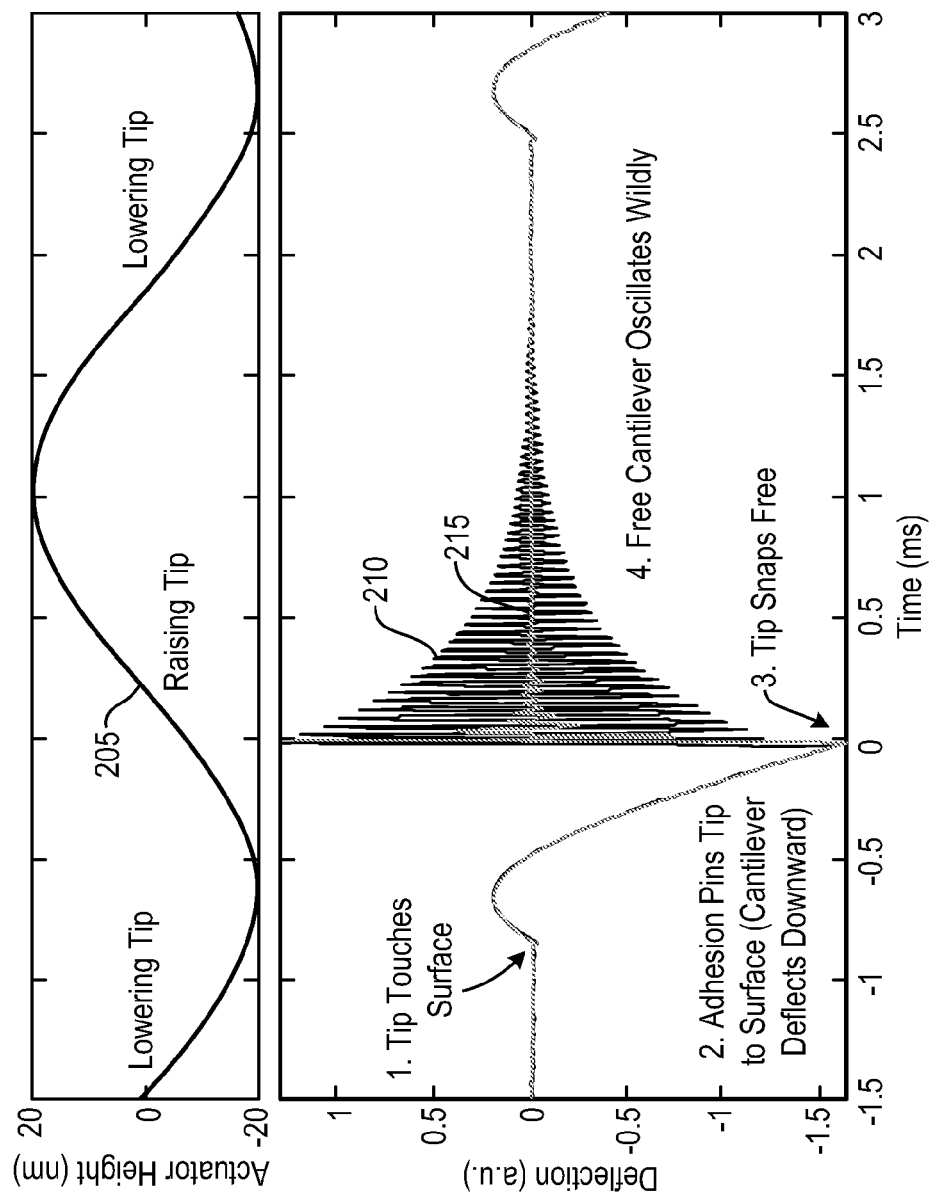
FIG. 2 is a graph showing an actuator height and cantilever deflection of an AFM system when performing a force-height measurement.

FIG. 2 is a graph showing an actuator height and cantilever deflection of an AFM system when performing a force-height measurement. For explanation purposes, it will be assumed that this graph, as well as graphs shown in other drawings were generated in relation to AFM system 100. In the example of FIG. 1, it is also assumed that measurements are taken of only one pixel, although the illustrated procedure could also be applied while scanning probe tip 120 across a sample.

Referring to FIG. 2, a first curve 205 shows the height adjustment of cantilever arm 115 as a function of time. More specifically, it shows the height of an actuator implementing the height adjustment component as described above. In this example, cantilever arm 115 is moved up and down sinusoidally at a rate of 300 Hz.

Second and third curves 210 and 215 show the deflection of cantilever arm 115 on the same time scale as first curve 205. Second curve 210 represents the cantilever deflection in the absence of active damping—i.e., where the active damping component is turned off throughout the measurement process, and third curve 215 represents the cantilever deflection in the presence of selective active damping—i.e., where the active damping component is enabled after the ringing starts and then subsequently disabled after the ringing is sufficiently damped.

First curve 205 can be referred to as a height curve, and second and third curves 210 and 215 can be referred to force curves. Together, these curves can be used to generate force-height measurements to be transformed into quantitative measurements of material properties. The transforming can be performed, for instance, with reference to nonmechanical models.

As illustrated by second and third curves 210 and 215, in a first period from about −1.5 ms to −0.7 ms, cantilever arm 115 is located in free space and is substantially free of influence from the sample surface. Accordingly, it has zero deflection during this period. Then, as probe tip 120 is lowered, it eventually touches the sample surface at about −0.7 ms. As illustrated by a small dip in the cantilever deflection at −0.7 ms, the sample surface initially exhibits a small attractive force that pulls probe tip 120 toward it.

Thereafter, in a second period from about −0.7 to −0.6 ms, probe tip 120 is pressed against the sample surface, which causes cantilever arm 115 to deflect upward. The deflection reaches a maximum value at about −0.6 ms, which corresponds to the lowest point of the actuator height as shown in first curve 205.

Subsequently, in a third period from about −0.6 to −0.01 ms, the actuator height is increased to lift cantilever arm 115 and raise probe tip 120 from the sample surface. However, due to an adhesive force between probe tip 120 and the sample surface, cantilever arm 115 deflects downward as its proximal end is raised up by the actuator. This downward deflection creates an upwards spring force in cantilever arm 115, which eventually exceeds the adhesive force at about −0.01 ms. Because the maximum downward deflection of cantilever arm 115 is determined by the strength of adhesion between probe tip 120 and the sample surface, this information may be useful for determining material properties of the sample, such as its stickiness or composition.

When the spring force in cantilever arm 115 exceeds the adhesive force at about −0.01 ms, probe tip 120 snaps free from the sample surface and produces ringing vibrations in cantilever arm 115. As illustrated by second curve 210, in the absence of active damping, the ringing vibrations endure for a fourth period from about −0.01 to 2.0 ms. However, as illustrated by third curve 215, in the presence of selective active damping, these vibrations decay fairly rapidly and are substantially eliminated by about 0.5 ms.

While cantilever arm 115 is ringing, it is difficult to detect interactions between probe tip 120 and the sample surface. Accordingly, it is generally necessary to wait for the ringing to disappear before performing a next force-height measurement. This creates a significant delay in the measurement process. Moreover, if the ringing is strong enough, it may collide violently with the sample, causing potential damage to both the probe tip and the sample.

Finally, after the ringing dies down, the next force-height measurement begins when probe tip 120 again touches down on the sample surface at about 2.45 ms. This process can be repeated indefinitely for a single location of a sample, and it can also be performed at different locations by moving probe tip 120 across the sample surface between measurements.

In the example of FIG. 1, the frequency of the sinusoid is chosen based on the relatively slow recovery of second curve 210 after the ringing. This frequency limits the force-curve repetition rate, and it can be significantly increased when active damping is used. For example, the frequency can be adjusted such that probe tip 120 touches down on the sample surface for a second time shortly after 0.5 ms, when the active damping has substantially removed the ringing. Accordingly, the selective use of active damping can significantly increase the force-curve repetition rate, speeding up the process of generating force-height measurements.

Figure 3:
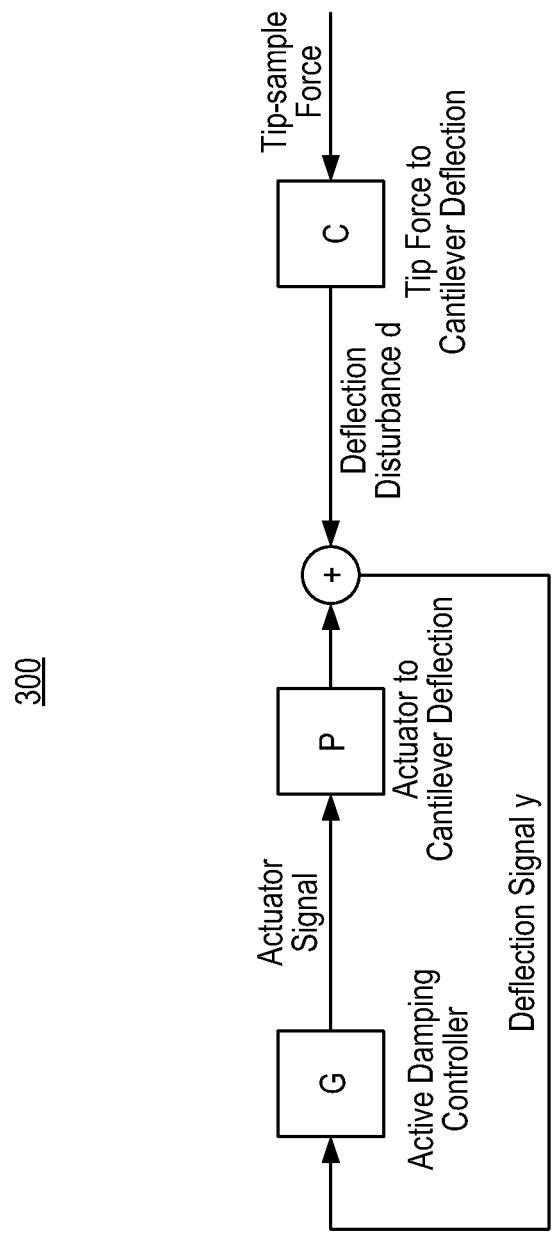
FIG. 3 is a conceptual block diagram of an AFM system providing selective active damping according to a representative embodiment.

FIG. 3 is a conceptual block diagram of an AFM system 300 providing selective active damping according to a representative embodiment. This diagram can be viewed as a more abstract representation of certain parts of AFM system 100, for example.

Referring to FIG. 3, AFM system 300 comprises a controller "G", a plant "P", and a cantilever system "C". Controller G controls selective active damping, and it can be implemented, for instance, by controller 135 of FIG. 1. Plant P corresponds to physical components controlled by controller G, and it can be implemented, for instance, by the height adjustment component and the active damping component of actuator 110. Cantilever system C can be implemented, for instance, by cantilever arm 115 and probe tip 120.

During operation of AFM system 300, interactions between a probe tip and a sample surface produce a tip-sample force. This force is applied to cantilever system C as indicated by an arrow. Cantilever system C converts the force into cantilever deflection.

During a period in which cantilever system C is deemed to be in a ringing state (e.g., from −0.01 to 0.5 ms in FIG. 2), its vibration is represented as a disturbance "d". This disturbance d is combined with a cancellation signal produced by the operation of controller G and plant P in order to remove it from a deflection signal "y".

In mathematical terms, AFM system 300 should be designed to produce a small value of the equation $y/d=1/(1-GP)$. This can be accomplished by configuring controller G to drive the actuator to null out the dominant vibration modes of the cantilever arm while avoiding destabilization of other resonances in AFM system 300. This design can be achieved through a process of calibration as will be described in further detail below with reference to FIG. 5.

Figure 4:
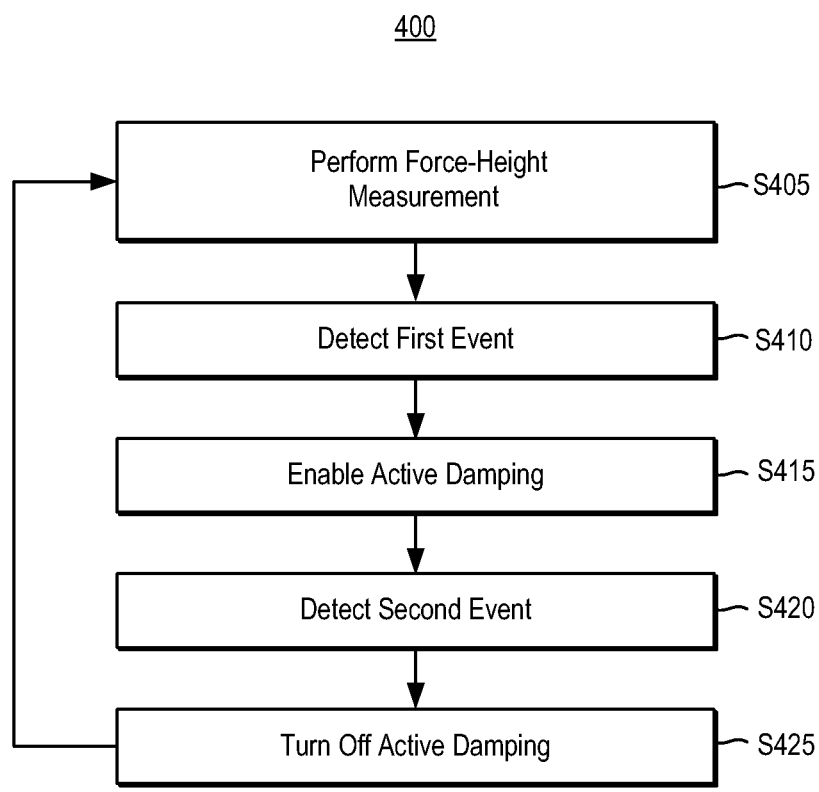
FIG. 4 is a flowchart illustrating a method of operating an AFM system with selective active damping according to a representative embodiment.
Figure 5:
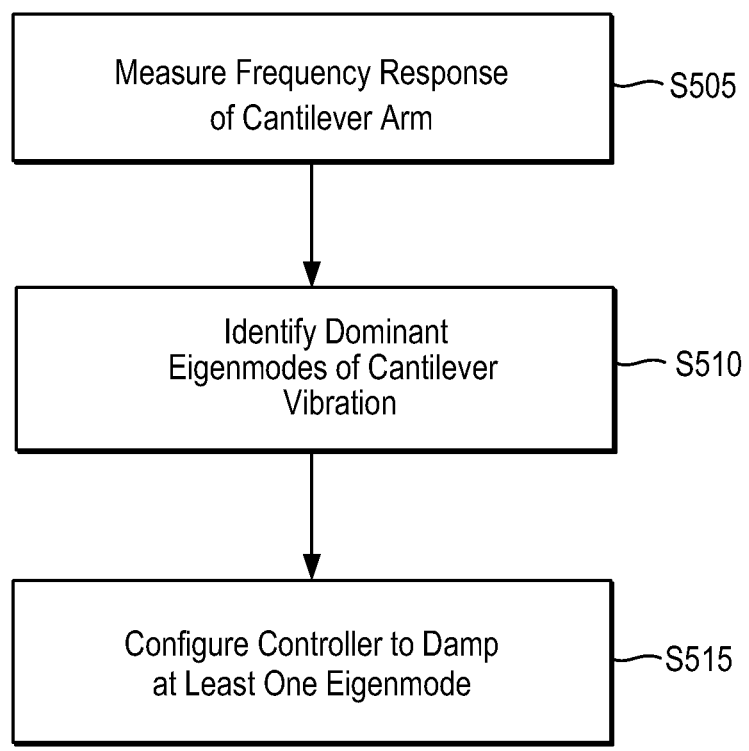
FIG. 5 is a flowchart illustrating a method of calibrating an AFM system for selective active damping according to a representative embodiment.

FIG. 4 is a flowchart illustrating a method 400 of operating an AFM system with selective active damping according to a representative embodiment. For explanation purposes, it will be assumed that this method and the method of FIG. 5 are performed in relation to AFM system 100 of FIG. 1, although these methods are not limited to AFM system 100. In the description that follows, example method features will be indicated by parentheses (SXXX) to distinguish them from example system or device features.

Referring to FIG. 4, the method begins by performing a force-height measurement (S405). This may comprise, for instance, controlling actuator 110 to move cantilever arm 115 as shown in FIGS. 1A-1C. Example results of the force-height measurement are represented by the first through third periods of FIG. 2.

Next, the method detects a first event indicative of ringing of cantilever arm 115 (S410). in the example of FIG. 2, this detection occurs at about 0 ms. This detection can be accomplished by various alternative methods. For example, it can be accomplished by monitoring the cantilever deflection signal and then detecting ringing when the signal goes negative and subsequently crosses zero in a positive direction, indicating that the tip has been pulled down and then released. Alternatively, ringing can be detected where the derivative of the signal exceeds a threshold value, or where the signal exhibits a predetermined amount of energy around a specific eigenmode of cantilever vibration. In yet another alternative, the method may determine that ringing is occurring based on the passage of time. In other words, the first event may simply be a timing event indicating that ringing is likely occurring based on previously observed timing of AFM system, a calibration process, or a model of the system's operation.

Next, active damping is enabled, or turned on, as a consequence of detecting the first event (S415). Where active damping is enabled, controller 135 applies a control signal to the active damping component to suppress the ringing. This control signal is typically designed to eliminate vibrations at one or more dominant eigenmodes of cantilever vibration. In some embodiments, active damping may be enabled in a gradual fashion to avoid introducing undesired resonances into AFM system 100. For instance, if active damping were enabled suddenly, the control signal for the active damping component (e.g., an actuator voltage) could initially take the form of a step function. Such a step function could potentially excite all of the resonances in the system, which can produce additional disturbances. One way to enable active damping gradually is to gradually increase the gain of the actuator voltage until it is fully engaged. In other words, the actuator voltage can be applied with a relatively low gain upon initial enabling or engagement of the active damping, and it can be increased gradually. Another possible approach to filtering the actuator voltage (e.g., using a low-pass filter) to eliminate potentially troublesome frequencies.

After active damping has been enabled, the method detects a second event indicating that the ringing has been adequately suppressed (S420). In the example of FIG. 2, this detection occurs at about 0.5 ms. This detection can be performed by various methods, such as detecting that the energy of the cantilever deflection signal at a particular eigenmode has dropped below a predetermined threshold or detecting passage of a predetermined time since the ringing began, for example.

Finally, active damping is disabled, or turned off, as a consequence of detecting the second event (S425). Thereafter, the method returns to S405 and additional measurements are performed, similar to the example shown in FIG. 2.

FIG. 5 is a flowchart illustrating a method 500 of calibrating an AFM system for selective active damping according to a representative embodiment.

Referring to FIG. 5, the method begins by calculating the frequency response of cantilever arm 115 (S500). More particularly, it calculates the deflection response of cantilever arm 115 as a function of different frequencies of an actuator signal controlling its motion. This frequency response provides an indication of the eigenmodes of vibration of cantilever arm 115. These modes generally account for most of the energy in cantilever arm 115 when it is ringing, while other modes have less impact. Accordingly, sufficient active damping can generally be achieved by suppressing vibrations at one or more of the dominant eigenmodes while ignoring other modes of vibration.

The method next identifies one or more dominant eigenmodes of the cantilever vibration to be suppressed by active damping (S510). For instance, it may identify a first order eigenmode as the mode to be suppressed. Finally, the method configures controller 135 to damp the identified eigenmode (S515). This can be accomplished, for instance, by implementing a bandpass filter centered around the identified eigenmode, and then determining how to control the actuator signal to cancel the filtered signals. The above operations of method 500 can generally be performed automatically, as will be described in further detail below.

Figure 6:
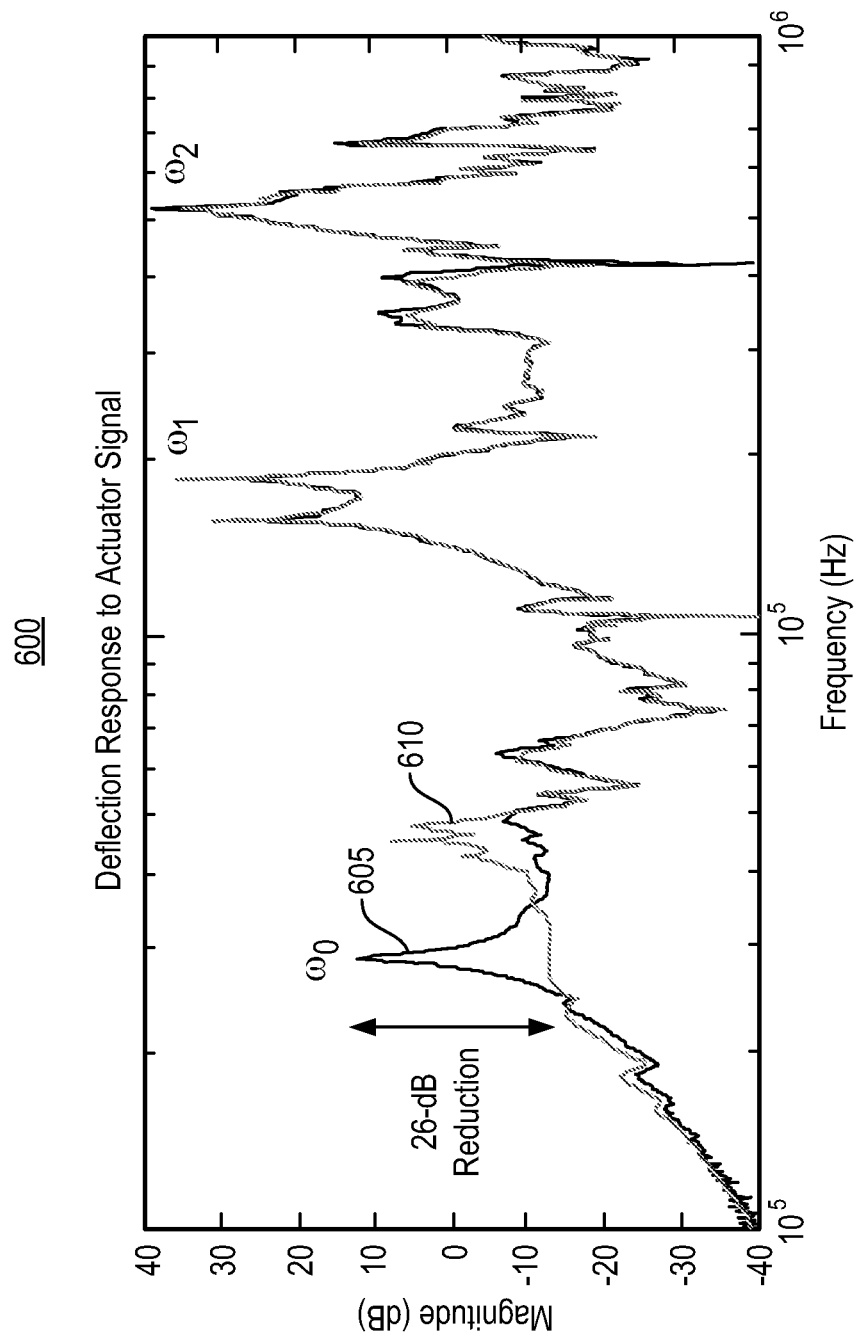
FIG. 6 is a graph showing a frequency response of cantilever deflection in an AFM system with and without selective active damping according to a representative embodiment.

FIG. 6 is a graph showing a frequency response of cantilever deflection in an AFM system with and without selective active damping according to a representative embodiment. For explanation purposes, it will be assumed that the graph was generated in relation to AFM system 100.

Referring to FIG. 6, a first curve 605 shows the frequency response of cantilever deflection without active damping, and a second curve 610 shows the frequency response of cantilever deflection with selective active damping. As indicated by the x-axis, the frequency response is measured over a range of $10^4$ to $10^6$ Hz.

The frequency response is measured by driving cantilever arm 115 at each of the illustrated frequencies and observing its deflection. Cantilever arm 115 can be driven by, for instance, a piezoelectric component in actuator 110. At low frequencies, cantilever arm 115 is simply moving up and down and it does not bend. Consequently, the magnitude of cantilever deflection goes to zero as the frequency goes to zero. As the frequency increases, cantilever arm 115 deflects (or shakes) more, and it has peak amounts of deflection at various eigenmodes labeled $\omega_0$, $\omega_1$, and $\omega_2$ in first curve 605.

In various practical applications, such as the measurement of material properties, higher order eigenmodes, such as $\omega_1$ and $\omega_2$, will typically not be excited. As a result, most of the disturbance will occur around $\omega_0$. Consequently, in order to address ringing such as that illustrated in FIG. 2, AFM system 100 may be designed to suppress a single eigenmode, such as $\omega_0$.

As illustrated by second curve 610, the active damping reduces cantilever deflection by about 26 dB around $\omega_0$. This reduction in cantilever deflection can be used to damp ringing as illustrated, for instance, by third curve 215 in FIG. 2.

The information shown in FIG. 6 can be used to automate portions of the calibration procedure illustrated in FIG. 5. The following is one example of such an automated procedure, as described with reference to AFM system 300. In the following description, the symbols G and P will represent the respective system responses of controller G and plant P.

In this procedure, once the frequency response of the cantilever arm is known, a reasonable starting point for G is a band-pass filter centered around a first-order eigenmode of the cantilever arm, such as $\omega_0$. The implementation of such a band-pass filter will suppress the response to DC shifts and higher eigenmodes. Minimizing $1/(1-GP)$ at $\omega_0$ implies that the phase of $GP=\pi$, and $|GP|\gg 1$. The phase condition can be achieved by detuning the bandpass such that the phase of $G(\omega_0)$ is equal to $\pi$ minus the phase of $P(\omega_0)$. By using a second-order bandpass filter, any phase between plus or minus $\pi$ can be attained. Once the phase of G is established, $|G|$ can be maximized subject to some stability margin (for instance, gain and phase margins). Higher eigenmodes, especially when amplified by actuator resonances, may still limit performance, so these may be automatically identified and compensated with notch filters.

Figure 7:
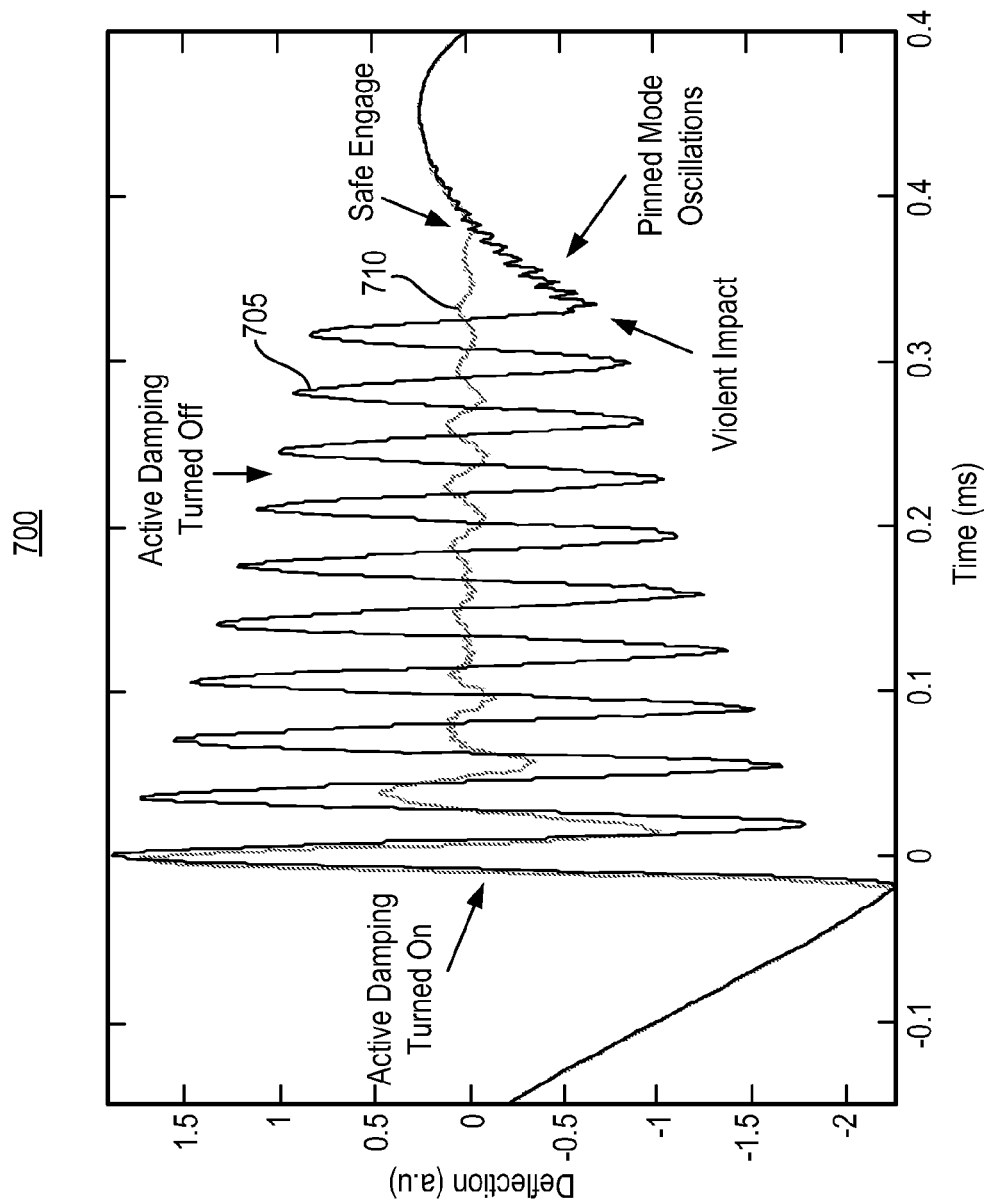
FIG. 7 is a graph showing cantilever deflection of an AFM system with and without selective active damping according to a representative embodiment.

FIG. 7 is a graph showing cantilever deflection of an AFM system with and without selective active damping according to a representative embodiment. In this example, the AFM system generates force-height curves by lowering and raising the its cantilever arm in a periodic fashion with a frequency of 1500 Hz. This is 5× faster than the example of FIG. 2, which used a slower frequency of 300 Hz to allow natural decay of ringing vibrations.

Referring to FIG. 7, a first force-height measurement begins when the cantilever arm is lowered to press a probe tip into a measurement surface. This occurs at a time prior to the curves shown in FIG. 7. The cantilever arm is then raised to lift the probe tip off the sample surface, resulting in negative cantilever deflection due to an adhesive force between the probe tip and the sample, as illustrated between −0.15 and −0.1 ms. Thereafter, the probe tip snaps off of the surface at about −0.02 ms, producing ringing of the cantilever arm for multiple milliseconds. Where active damping is used to suppress the ringing, the active damping is turned on shortly after −0.02 ms, as illustrated by an arrow in FIG. 7.

A first curve 705 shows ringing that occurs in the absence of active damping, and a second curve 710 shows ringing that occurs in the presence of active damping. As illustrated by differences in magnitude between these two curves, the active damping results in a significantly faster recovery from the damping, allowing a next force-height measurement to begin at about 0.4 ms.

At about this time, the active damping is turned off, and the probe tip is again brought into contact with the measurement surface. However, as indicated by an arrow at about 0.32 ms, without active damping the cantilever arm may violently impact the surface, potentially damaging the surface producing still further vibrations, referred to as pinned mode oscillations. In contrast, the actively damped cantilever arm contains little energy as it engages the sample, avoiding the potential damage and pinned mode oscillations.

In addition to allowing relatively fast operation, the use of active damping as illustrated in FIG. 7 can also improve deflection measurements by making it easier to detect a bias (e.g., from electronic drift) in the deflection signal. For instance, as illustrated in FIG. 7, second curve 710 can be seen to be vibrating with a baseline deflection value of about 0. For instance, between 0.1 and 0.38 ms, it can be seen to go slightly above and then slightly below zero deflection. If there were a bias in this signal, this baseline deflection would be offset from zero and may require correction, e.g., through post processing or some other mechanism. However, it is much more difficult to detect any bias in first curve 705 due to its larger magnitude.

While representative embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method of operating an atomic force microscope (AFM) system comprising a cantilever arm attached to a probe tip, the method comprising:
controlling a height of the cantilever arm to press the probe tip against a sample and then separate the probe tip from the sample;
detecting a vibration of the cantilever arm after the separation of the probe tip from the surface; and
engaging active damping of the cantilever arm to counteract the vibration of the cantilever to increase a rate of decay of the vibration of the cantilever arm compared to a natural damping of the cantilever arm.

2. The method of claim 1, further comprising detecting suppression of the vibration, and disengaging the active damping upon detecting the suppression.

3. The method of claim 1, further comprising disengaging the active damping after it has been engaged for a predetermined time.

4. The method of claim 1, wherein detecting the vibration comprises detecting, that a deflection of the cantilever arm changes from a negative value to a positive value.

5. The method of claim 1, wherein detecting the vibration comprises detecting that a derivative of a cantilever deflection signal exceeds a predetermined threshold.

6. The method of claim 1, wherein controlling the height of the cantilever arm comprises operating a first piezoelectric actuator, and engaging the active damping comprises operating a second piezoelectric actuator that is separate from the first piezoelectric actuator.

7. The method of claim 1, further comprising:
measuring an eigenmode of the cantilever arm; and
configuring a controller to perform the active damping by suppressing vibration of the cantilever arm at the eigenmode.

8. The method of claim 1, wherein engaging the active damping comprises applying a control signal to an actuator to counteract the vibration.

9. The method of claim 8, further comprising filtering the control signal before applying it to the actuator.

10. The method of claim 8, further comprising applying the control signal with a relatively low gain upon initial engagement of the active damping and then increasing the gain.

11. An atomic force microscope (AFM) system, comprising:
a cantilever arm;
a probe tip attached to the cantilever arm; and
a controller configured to control a height of the cantilever arm to press the probe tip against a sample and then separate the probe tip from the sample, to detect a vibration of the cantilever arm after the separation of the probe tip from the surface, and to engage active damping of the cantilever arm to counteract the vibration of the cantilever to increase a rate of decay of the vibration of the cantilever arm compared to a natural damping of the cantilever arm.

12. The AFM system of claim 11, further comprising:
a first actuator configured to control the height of the cantilever arm; and
a second actuator configured to control the active damping of the cantilever arm.

13. The AFM system of claim 12, wherein the second actuator is further configured to periodically oscillate the cantilever arm during an alternating current (AC) mode operation of the AFM system.

14. The AFM system of claim 11, wherein the controller is further configured to detect suppression of the vibration and to disengage the active damping upon detecting the suppression.

15. The AFM system of claim 11, wherein the active damping is configured to suppress first-order eigenmode vibrations in the cantilever arm while ignoring other eigenmode vibrations.

* * * * *